(12) United States Patent
Duenas et al.

(10) Patent No.: US 12,242,404 B2
(45) Date of Patent: Mar. 4, 2025

(54) PROVIDING PLATFORM MANAGEMENT PROFILES TO PLATFORM MANAGEMENT DRIVERS ON ELECTRONIC DEVICES

(71) Applicant: ATI Technologies ULC, Markham (CA)

(72) Inventors: Alexander Sabino Duenas, Toronto (CA); Ashwini Chandrashekhara Holla, Toronto (CA); I-Cheng Chen, Toronto (CA); Xinzhe Li, Toronto (CA)

(73) Assignee: ATI Technologies ULC, Markham (CA)

( * ) Notice: Subject to any disclaimer, the term of this patent is extended or adjusted under 35 U.S.C. 154(b) by 354 days.

(21) Appl. No.: 17/559,984

(22) Filed: Dec. 22, 2021

(65) Prior Publication Data

US 2023/0195666 A1 Jun. 22, 2023

(51) Int. Cl.
*G06F 13/36* (2006.01)
*G06F 21/62* (2013.01)

(52) U.S. Cl.
CPC .......... *G06F 13/36* (2013.01); *G06F 21/6218* (2013.01)

(58) Field of Classification Search
CPC .............................. G06F 13/36; G06F 21/6218
See application file for complete search history.

(56) References Cited

U.S. PATENT DOCUMENTS

| | | | |
|---|---|---|---|
| 2003/0005367 A1* | 1/2003 | Lam | G06F 11/0784 714/42 |
| 2003/0055955 A1* | 3/2003 | Cheng | H04L 41/00 709/224 |
| 2007/0079154 A1* | 4/2007 | Diefenbaugh | G06F 1/324 713/300 |
| 2007/0240197 A1* | 10/2007 | Blumenthal | H04L 63/0227 726/1 |
| 2008/0046546 A1* | 2/2008 | Parmar | G06F 11/3006 714/E11.202 |
| 2013/0281077 A1* | 10/2013 | Zou | H04L 65/1059 455/418 |
| 2019/0215343 A1* | 7/2019 | Rykowski | H04L 63/205 |

\* cited by examiner

*Primary Examiner* — Nimesh G Patel
(74) *Attorney, Agent, or Firm* — FIG. 1 Patents

(57) ABSTRACT

An electronic device includes a memory and a processor. The processor acquires a platform management profile, the platform management profile including information defining one or more platform management policies. The processor provides the platform management profile to platform management drivers executing on one or more electronic devices, the platform management profile being configured so that each of the platform management drivers can extract the one or more platform management policies from the platform management profile and use the one or more platform management policies for controlling operating states of elements (e.g., functional blocks, devices, etc.) of the respective electronic device.

19 Claims, 7 Drawing Sheets

PROVIDING PLATFORM MANAGEMENT PROFILES TO PLATFORM MANAGEMENT DRIVERS ON ELECTRONIC DEVICES

BACKGROUND

Related Art

Some electronic devices include processors that execute program code (e.g., applications, operating systems, etc.) along with memories that store data for use by the processors. Many of such electronic devices also include other functional blocks and devices that are used for/when executing program code and/or for other purposes in the electronic devices (e.g., mass data storage devices, network interfaces, peripherals, human interfaces, etc.). For example, electronic devices such as desktops (i.e., desktop computers), laptops, and servers often include processors and memories as well as other functional blocks and devices. Because processors, memories, and other functional blocks and devices in electronic devices generate heat during operation (e.g., due to Joule heating, etc.), the electronic devices include fans that circulate air through the electronic devices to prevent overheating. The electronic devices can also include one or more management units that control operating states of the processors, memories, and/or other functional blocks and devices so that the electronic devices provide a desired level of performance (e.g., are adequately responsive to user inputs, etc.) while avoiding unnecessary consumption of electrical power and the associated generation of heat. For example, the management units can place processors and/or other functional blocks and devices into lower performance modes to conserve electrical power and avoid generating excess heat when lower performance is acceptable. Given the reduced heat generation, operating in the lower performance modes means that the electronic devices can be kept cool at lower fan speeds, and thus can operate more quietly (i.e., as perceived by users of the electronic devices). As another example, the management units can place processors and/or other functional blocks and devices into higher performance modes when higher performance is desired (e.g., to execute more computationally intense workloads, etc.), although this can mean increased electrical power consumption and generation of heat. The increased generation of heat can necessitate higher fan speeds to keep the electronic devices cool—and thus mean louder operation for the electronic devices. In some of such electronic devices, for determining the operating conditions of the processors, memory, and/or other functional blocks and devices, the management units rely on information provided by numerous hardware sensors and software parameters returned from software sensor program code (i.e., values returned from software monitoring or reporting routines, from applications, from an operating system, etc.). For example, hardware sensors can provide information such as temperature information, fan speed information, and power source information. As another example, the software sensor program code can provide software parameters such as software application information, plug/unplug events information, power mode information, functional block/device status information, etc. Given the large volume of information provided by hardware sensors, the large number of software parameters, and the number of possible operating conditions for the processors, memory, and/or other functional blocks and devices, it can be difficult to strike a balance between maximizing performance of electronic devices with keeping the electronic devices relatively cool and quiet.

BRIEF DESCRIPTION OF THE FIGURES

Throughout the figures and the description, like reference numerals refer to the same figure elements.

DETAILED DESCRIPTION

Figure 1:
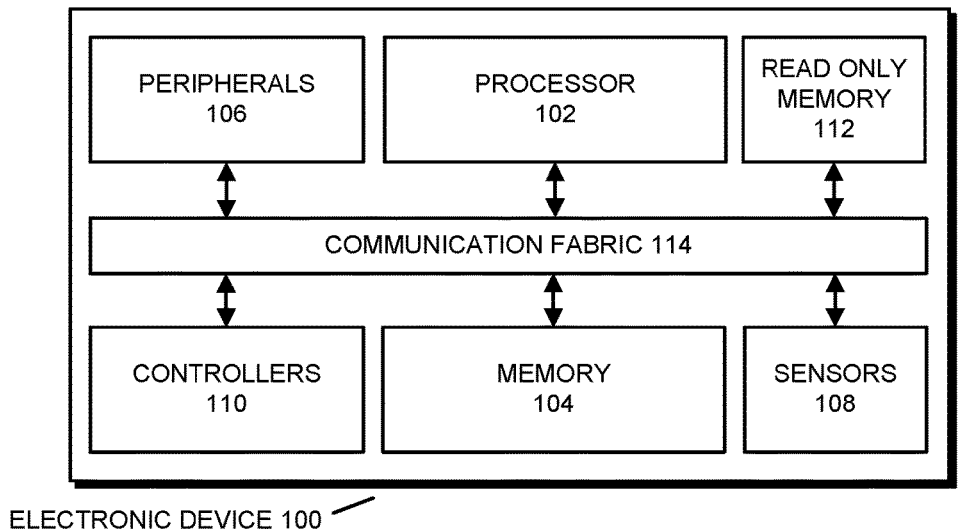
FIG. 1 presents a block diagram illustrating an electronic device in accordance with some implementations.

The following description is presented to enable any person skilled in the art to make and use the described implementations and is provided in the context of a particular application and its requirements. Various modifications to the described implementations will be readily apparent to those skilled in the art, and the general principles described herein may be applied to other implementations and applications. Thus, the described implementations are not limited to the implementations shown, but are to be accorded the widest scope consistent with the principles and features described herein.

In the following description, various terms are used for describing implementations. The following is a simplified and general description of some of the terms. Note that these terms may have significant additional aspects that are not recited herein for clarity and brevity and thus the description is not intended to limit these terms.

Functional block: functional block refers to a set of interrelated circuitry such as integrated circuit circuitry, discrete circuitry, etc. The circuitry is "interrelated" in that circuit elements in the circuitry share at least one property. For example, the circuitry may be included in, fabricated on, or otherwise coupled to a particular integrated circuit chip, substrate, circuit board, or portion thereof, may be involved in the performance of specified operations (e.g., computational operations, control operations, memory operations, etc.), may be controlled by a common control element and/or a common clock, may be included in the same electronic devices, etc. The circuitry in a functional block can have any number of circuit elements, from a single circuit element (e.g., a single integrated circuit logic gate or discrete circuit element) to millions or billions of circuit elements (e.g., an integrated circuit memory). In some implementations, functional blocks perform operations "in hardware," using circuitry that performs the operations without executing program code.

Data: data is a generic term that indicates information that can be stored in memories (e.g., a main memory, a cache memory, etc.) and/or used in computational, control, and/or other operations. Data includes information such as actual data (e.g., results of computational or control operations, outputs of processing circuitry, inputs for computational or control operations, variable values, sensor values, etc.), files, program code instructions, control values, variables, and/or other information.

In the described implementations, electronic devices include elements (e.g., functional blocks and devices such as processors, memories, peripheral devices, network interfaces, fans, etc.). For example, the electronic devices may include tablet computers, laptop computers, desktop computers, etc. In operation, elements in electronic devices generate heat, e.g., via Joule/resistive heating, etc., which can cause problems for the elements due to overheating, repeated heating/cooling cycles, and other effects. The electronic devices therefore include fans arranged to circulate atmospheric air into/through the electronic devices (i.e., vent hot air out of the electronic devices). The electronic devices also include one or more controllers that are arranged to dynamically set operating states of elements. For example, the controllers can set operating parameters such as the voltage at which electrical power is supplied to the elements, the frequencies of controlling clocks for the elements, the brightness of displays, etc. The electronic devices further include fan controllers that set speeds for fans in the electronic devices.

In the described implementations, processors in electronic devices execute a platform management driver. The platform management driver is lower-level software (e.g., driver software situated between an operating system and electronic device hardware in a software hierarchy) that performs operations for controlling operating states of elements of a respective electronic device (and possibly other operations). In some implementations, the platform management driver interacts with the above-described operating controllers and/or fan controllers for controlling the operating states of the elements (e.g., functional blocks, devices, fans, etc.) of the respective electronic device. For this operation, the platform management driver receives a number of inputs from hardware sensors and software sensor program code in the respective electronic device (e.g., temperature sensors, software/workload information, subsystem usage sensors, etc.) and controls the operating states of the elements of the respective electronic device based on the inputs (i.e., based on whether the inputs meet specified conditions, such as via comparisons including IF, NOT, AND, EQUALS, GREATER THAN, etc.). For this operation, the platform management driver compares values for inputs (e.g., temperatures from a temperature sensor) to corresponding threshold(s) and determines output actions to be taken for controlling operating states of the elements in the respective electronic device. For example, when a temperature reported by a temperature sensor (an input) exceeds a temperature threshold (a condition), the platform management driver can communicate a request to a fan controller to cause one or more fans to be increased in speed, communicate requests to operating controllers to cause elements to be operated in lower power operating modes, etc. (output actions).

In the described implementations, a platform management driver can be statically and/or dynamically configured/reconfigured for performing operations for controlling operating states of elements of a respective electronic device. In other words, the platform management driver can be configured/reconfigured to perform respective output actions based on inputs meeting specified conditions. The platform management driver is configured using platform management profiles, which are files (or other data structures) that include information defining one or more platform management policies. Each of the platform management policies includes input information that identifies one or more inputs for that platform management policy; condition information that identifies one or more conditions for or associated with the one or more inputs; and output action information identifying one or more output actions to be performed by a given platform management driver for controlling operating states of elements when the one or more conditions are met. Note that controlling operating states of "elements," as described herein, can include controlling operating states of individual elements (e.g., individual functional blocks, devices, fans, etc.) or groups of elements. The electronic devices can be "statically" configured in that the electronic devices can have platform management profiles installed at manufacture time and/or at another time prior to a user using the electronic device. The electronic devices can be "dynamically" configured in that the electronic devices can have platform management profiles installed and/or updated at runtime, e.g., at startup of the electronic devices, etc.

In some implementations, an installing electronic device provides platform management profiles to other, or "target," electronic devices. In these implementations, the installing electronic device first acquires a platform management profile that includes information defining one or more platform management policies. The installing electronic device then provides the platform management profile to platform management drivers executing on one or more target electronic devices. The platform management drivers then extract the one or more platform management policies from the platform management profile and use the one or more platform management policies for controlling operating states of elements of a respective target electronic device. Note that, in some of these implementations, the installing electronic device and the target electronic device are the same electronic device—and thus the above-described operations are performed within a particular electronic device.

In some implementations, for acquiring platform management profiles as described above, the installing electronic device receives platform management policies and/or platform management profiles via a graphical user interface. The user interface includes graphical elements selectable by users for defining platform management policies and/or platform management profiles. In these implementations, the installing electronic device provides a user interface including input elements representing inputs available for use in platform management policies, output action elements representing output actions available for use in platform management policies, and condition elements representing conditions under which values for the inputs are to cause respective output actions. The installing electronic device then receives selection actions for the user interface (i.e., mouse points/clicks and/or other selection operations) that select combinations of input elements, output action elements, and condition elements defining the one or more platform management policies of the platform management profile. Based at least in part on the selection actions, the installing electronic device then generates platform management policies and/or platform management profiles in which platform management policies are included. In some implementations, however, for acquiring platform management profiles as described above, the installing electronic device receives platform management policies and/or platform management profiles through other means, such as by receiving manually created platform management policies and/or platform management profiles (i.e., using a text editor, a command line interface, etc.), by reading the platform management profiles from memory, etc.

In some implementations, for providing platform management profiles to electronic devices as described, the installing electronic device provides policy header files to the electronic devices. Generally, policy header files are files (or other data structures) that include information from which platform management drivers can extract platform management profiles—and thus the platform management policies included therein. In some of these implementations, the installing electronic device provides the policy header file to the electronic devices "statically." For example, the installing electronic device can provide the policy header file to the electronic devices at manufacture time as one or more parts of the electronic devices are fabricated, assembled, and/or otherwise manufactured, in a testing lab as one or more parts of the electronic devices are tested, evaluated, etc., and/or at another time. In some of these implementations, the installing electronic device provides the platform management profile via basic input-output system (BIOS) files to be installed on the electronic devices. In these implementations, the installing electronic device first creates the policy header file including the platform management profile (acquired as described above). The installing electronic device then compiles the policy header file into the BIOS files. The installing electronic device next stores the BIOS files in a memory element on a given electronic device upon which the platform management driver is to be executed. For example, the installing electronic device can write the BIOS files in a read-only memory in the electronic devices in which BIOS files are stored. In these implementations, the platform management driver reads the BIOS files from the memory element and extracts the platform management profile from the BIOS files.

In some implementations, in contrast or in addition to statically providing policy header files to electronic devices, the installing electronic device provides the policy header file to the electronic devices "dynamically." As used here, "dynamically" indicates that the policy header file on a given device can be updated one or more times during the lifetime of an electronic device. For example, a vendor, manufacturer, user, and/or other entity may determine that particular platform management policies result in poor operation of electronic devices or figure out new platform management policies (e.g., based on newly available sensor information, electronic device usage data, etc.)—and therefore replace the particular platform management policies with updated platform management policies or add new platform management policies. There are at least two implementations for providing the policy header file from the installing electronic device to the platform management drivers, both implementations involving using a policy management application executing on the electronic devices as an intermediary for providing the policy header file to the respective platform management drivers. For both implementations, the installing electronic device creates a policy header file that includes the platform management profile (acquired as described above). For the first implementation, the installing electronic device then communicates the policy header file to the policy management application on each of the electronic devices. The policy management application extracts the platform management profile from the policy header file and forwards the platform management profile (or the policy header file itself) to the respective platform management driver (i.e., the policy management application communicates the platform management profile directly to the platform management driver). In this implementation, if the platform management profile is to be used after the electronic device is shut down, the policy management application again provides the platform management profile to the platform management driver on startup (or at another time). For the second implementation, after being provided the policy header file by the policy management application, the platform management driver adds the policy header file to BIOS files stored in a memory element. That is, the policy management application provides the policy header file to the platform management driver and the platform management driver compiles the policy header file into BIOS files stored in the memory element. For example, the platform management driver can write the BIOS files in a read-only memory in the electronic devices in which BIOS code is stored. In this implementation, the platform management driver reads the BIOS files from the memory element and extracts the platform management profile from the BIOS files each time the electronic device starts up (or at another time)—so that the policy management application need only communicate the policy header file to the platform management driver once.

In some implementations, in addition to the above-described operations, the installing electronic device performing one or more operations to ensure that policy header files can be safely used by platform management drivers (and safely included in BIOS files, in implementations where this happens). For example, the installing electronic device can encrypt or otherwise certify the policy header files (e.g., via digital fingerprinting, checksums, etc.) to avoid corruption of policy header files and/or malicious replacement of policy header files. As another example, the installing electronic device can perform checks to ensure that the contents of the policy header files are legally formatted and include permissible combinations of inputs, conditionals, and output actions—i.e., that the contents of policy header files meet security requirements.

By providing the platform management profile to platform management drivers executing on one or more electronic devices as described above, the described implementations can enable entities (e.g., manufacturers, vendors, users, etc.) to distribute platform management policies that enable platform management drivers to more precisely control operating states of elements (e.g., functional blocks, devices, fans, etc.) of electronic devices. This can enable the electronic devices to operate more intelligently with respect to available inputs (i.e., hardware and software parameter values) and thus be quieter (i.e., have less fan noise) and use power more efficiently. In addition, by providing the user interface and the mechanisms for providing/distributing policy header files to electronic devices, the described implementations provide a centralized platform management framework that enables entities to more easily handle power management and electronic device operation. The described implementations therefore improve both: (1) the process of generating controls for electrical power consumption and noise control for electronic devices and (2) the function of the electronic devices themselves. This increases user satisfaction with both the process and the electronic devices.

FIG. 1 presents a block diagram illustrating an electronic device 100 in accordance with some implementations. As can be seen in FIG. 1, electronic device 100 includes processor 102, memory 104, peripherals 106, sensors 108, controllers 110, read only memory 112, and communication fabric 114. Generally, processor 102, memory 104, peripherals 106, sensors 108, controllers 110, read only memory 112, and communication fabric 114 are implemented in hardware, i.e., using corresponding integrated circuitry, discrete circuitry, and/or devices. For example, in some implementations, processor 102, memory 104, peripherals 106, sensors 108, controllers 110, read only memory 112, and communication fabric 114 are implemented in integrated circuitry on one or more semiconductor chips, are implemented in a combination of integrated circuitry on one or more semiconductor chips in combination with discrete circuitry and/or devices, or are implemented in discrete circuitry and/or devices. In some implementations, processor 102, memory 104, peripherals 106, sensors 108, controllers 110, read only memory 112, and/or communication fabric 114 perform operations for or associated with using policy header files including platform management profiles for controlling operating states of elements (e.g., functional blocks, devices, etc.) in electronic device 100 as described herein.

Processor 102 is a functional block that performs computational, memory access, control, and/or other operations. For example, processor 102 can be a central processing unit (CPU), a graphics processing unit (GPU), an accelerated processing unit, a system on a chip (SOC), a field programmable gate array (FPGA), etc. For example, in some implementations, processor 102 is an SOC including one or more CPU cores—and peripherals 106 includes discrete graphics with one or more GPU cores (e.g., a graphics card with one or more GPUs). As another example, in some implementations, processor 102 is an SOC that includes one or more CPU cores, as well as one or more GPU cores.

Memory 104 is a functional block that stores data for processor 102 (and possibly other functional blocks in electronic device 100). For example, in some implementations, memory 104 is a higher capacity integrated circuit memory (e.g., a "main" memory, etc.) into which copies of data (e.g., 4 kB pages of data) retrieved from a storage device (not shown) are stored for accesses by processor 102. Memory 104 includes memory circuitry such as fourth generation double data rate synchronous dynamic random-access memory (DDR4 SDRAM) and/or other types of memory circuits, as well as control circuits for handling accesses of the data stored in the memory circuits.

Peripherals 106 includes functional blocks and devices that perform various operations and interact with other functional blocks and devices in electronic device 100. For example, in some implementations, peripherals 106 include one or more discrete GPUs, embedded controllers, power monitors, application specific integrated circuits (ASICs), digital signal processors (DSPs), network processors, disk drives or non-volatile semiconductor memories, expansion cards (e.g., video cards, sound cards, network interface controllers, etc.), mice/keyboards, displays, microphones, media players, and/or other peripherals.

Sensors 108 includes functional blocks and devices that perform operations for sensing internal and/or external operating environment values for electronic device 100. For example, in some implementations, sensors 108 include some or all of temperature sensors, proximity sensors (e.g., user detection sensors, etc.), user movement and/or gaze sensors, sound sensors, light sensors, location/movement sensors, lid closure sensors, external device detection sensors, battery level sensors, subsystem power mode sensors, position sensors, etc. Sensors 108 can provide data and information representing sensed operating environment values to other functional blocks and devices (e.g., processor 102), where the operating environment values can be used for operations such as determining whether condition involving a sensed environment value meets one or more conditions (e.g., a sensed temperature meets a temperature threshold, whether a user is detected as being present, etc.) for a platform management policy. In some implementations, sensors 108, which, again, include functional blocks and devices, are considered "hardware" sensors, in contrast to "software" sensor program code, which is implemented in software (e.g., operating system routines, application programs, firmware, etc.).

Controller 110 is a functional block that performs operations for controlling operating states of functional blocks and devices in electronic device 100. For example, in some implementations, controller 110 is or includes a fan controller that controls the speed of one or more cooling fans in electronic device 100. As another example, in some implementations, controller 110 is or includes a power controller or management unit that sets operating states of other functional blocks and devices (e.g., processor 102, peripherals 106, etc.) in electronic device 100.

Read-only memory (ROM) 112 is a functional block having non-volatile memory circuitry (e.g., flash memory, etc.) that is used for storing data that is to persist despite electronic device 100 having been powered down. In some implementations, read-only memory 112 is used for storing basic input output system (BIOS) and/or unified extensible firmware interface (UEFI) files with low-level program code that is executed during startup of electronic device. In some implementations, the BIOS (or UEFI) files include one or more policy header files with platform management profiles having a number of platform management policies as described herein.

Although electronic device 100 is shown in FIG. 1 with a particular number and arrangement of elements, in some implementations, electronic device 100 includes different numbers and/or arrangements of elements. For example, in some implementations, electronic device 100 includes a different number of processors 102. As another example, although shown with only one peripheral 106, in some implementations, electronic device 100 includes multiple separate peripherals, such as a network interface card, a GPU, expansion cards, etc. As another example, although shown with only one controller 110, in some implementations, electronic device 100 includes multiple separate controllers, such as a fan controller, an electrical power controller, etc. Electronic device 100 is also simplified for illustrative purposes. In some implementations, however, electronic device 100 includes additional and/or different elements. For example, electronic device 100 can include separate human interface subsystems (e.g., displays, speakers, keyboards, etc.), electrical power and/or battery subsystems, input-output (I/O) subsystems, etc. Generally, in the described implementations, electronic device 100 includes sufficient numbers and/or arrangements of elements to perform the operations herein described.

Electronic device 100 can be, or can be included in, any device that performs the operations described herein. For example, electronic device 100 can be, or can be included in, a desktop computer, a laptop computer, a wearable electronic device, a tablet computer, virtual or augmented reality equipment, a smart phone, an artificial intelligence (AI) or machine learning device, a server, a network appliance, a toy, a piece of audio-visual equipment, a home appliance, a vehicle, etc., and/or combinations thereof. In some implementations, electronic device 100 is included on one or more semiconductor chips. For example, in some implementations, electronic device 100 is entirely included in a single "system on a chip" (SOC) semiconductor chip, is included on one or more ASICs, etc.

Figure 2:
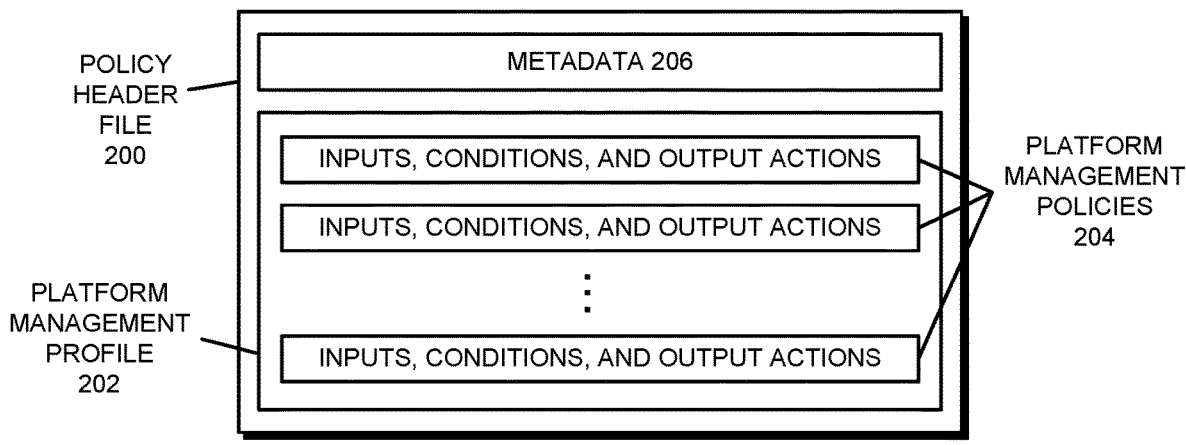
FIG. 2 presents a block diagram illustrating a policy header file in accordance with some implementations.

In the described implementations, a platform management driver (e.g., platform management driver 418) is configured to use platform management profiles for various operations. In some implementations, platform management profiles are communicated to platform the management driver using policy header files. FIG. 2 presents a block diagram illustrating a policy header file 200 in accordance with some implementations. Generally, policy header file 200 is a file (e.g., a binary, a configuration file, etc.), a record, a table, a listing, and/or another data structure that can be stored in memories, compiled into other files (e.g., BIOS files, etc.), read/interpreted by hardware and/or software entities (e.g., the platform management driver, etc.), etc. as described herein.

As can be seen in FIG. 2, policy header file 200 includes platform management profile 202. Platform management profile 202 is a grouping or other arrangement of platform management policies 204. In some implementations, policy header file 200 can include multiple different platform management policies 204, each of platform management policies 204 to be used in particular situations (e.g., for specified runtime conditions, etc.). Platform management policies 204 are each listings, records, and/or other identifiers for determining when a specified output action is to be taken based on one or more inputs meeting an indicated condition. Platform management policies 204 therefore include input information (INPUTS) that identifies one or more inputs for that platform management policy; condition information (CONDITIONS) that identifies one or more conditions for or associated with the one or more inputs; and output action information (OUTPUT ACTIONS) identifying one or more output actions to be performed by a given platform management driver for controlling operating states of elements (e.g., functional blocks, devices, fans, etc.) when the one or more conditions are met. For example, a platform management policy 204 may specify that a display screen of an electronic device is to be brightened (output action) when running (a condition) a particular application (an input) and an ambient light sensor (an input) detects bright light (a condition) in the environment of the electronic device. As another example, a platform management policy 204 may specify that, when a temperature reported by a temperature sensor (an input) exceeds a temperature threshold (a condition), one or more fans are to be increased in speed, elements are to be operated in lower power operating modes, etc. (output actions). In some implementations, the conditions include one or more logical or comparative operators such as IF, AND, NOT, GREATER THAN, EQUAL, etc.—and thus values of inputs and/or values representing inputs can be compared to thresholds (e.g., greater than zero or another value), determined to be asserted/deasserted, determined to match a specified pattern, determined to have a given rate, etc. In some implementations, the conditions are compound, in that the conditions include separate conditions to be met by each of two or more inputs.

Metadata 206 includes information identifying policy header file 200, such as a source of policy header file 200, version information for policy header file 200, security information for policy header file 200, etc.

Although policy header file 200 is presented with a number and arrangement of elements (e.g., platform management policies 204, etc.) in some implementations, policy header file includes different elements and/or the elements are arranged differently. Generally, in the described implementations, policy header file 200 includes sufficient elements to perform the operations herein described.

Figure 3:
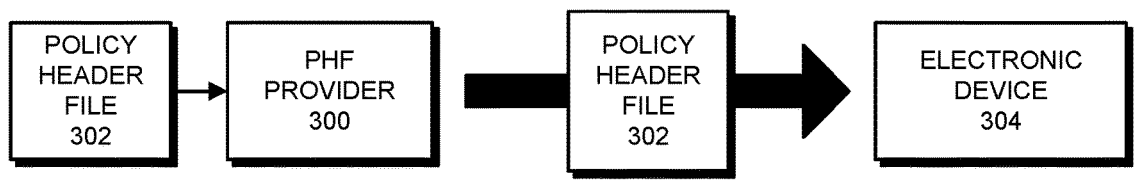
FIG. 3 presents a block diagram illustrating operations for providing a platform management profile to an electronic device in accordance with some implementations.

In the described implementations, an electronic device, or an "installing" electronic device, provides platform management profiles to electronic devices, or "target" electronic devices. FIG. 3 presents a block diagram illustrating operations for providing a platform management profile to an electronic device in accordance with some implementations. As can be seen in FIG. 3, policy header file provider 300, an installing electronic device, acquires policy header file 302, which includes at least one platform management profile (as described for FIG. 2). Policy header file provider 300 then provides policy header file 302 electronic device 304 (as shown via the black arrow). As described in more detail elsewhere herein, a platform management driver executed by electronic device 304 then uses the platform management profile included in policy header file 302 for controlling operating states of elements (e.g., functional blocks, devices, etc.) in the electronic device.

In the described implementations, various operations can be performed for providing the policy header file 302 to electronic device 304. For example, in some implementations, policy header file 302 is communicated to electronic device via a wired or wireless network. As another example, in some implementations, policy header file 302 is included on an integrated circuit chip (e.g., a ROM integrated circuit chip) that is installed in electronic device 304. Generally, in the described implementations, policy header file 302 is transferred from policy header file provider 300 (again, an installing electronic device) to electronic device 304. In addition, although described as separate electronic devices, in some implementations, policy header file provider 300 and electronic device 304 are the same electronic device—and thus the operations described herein are performed by entities within the same electronic device.

Figure 4:
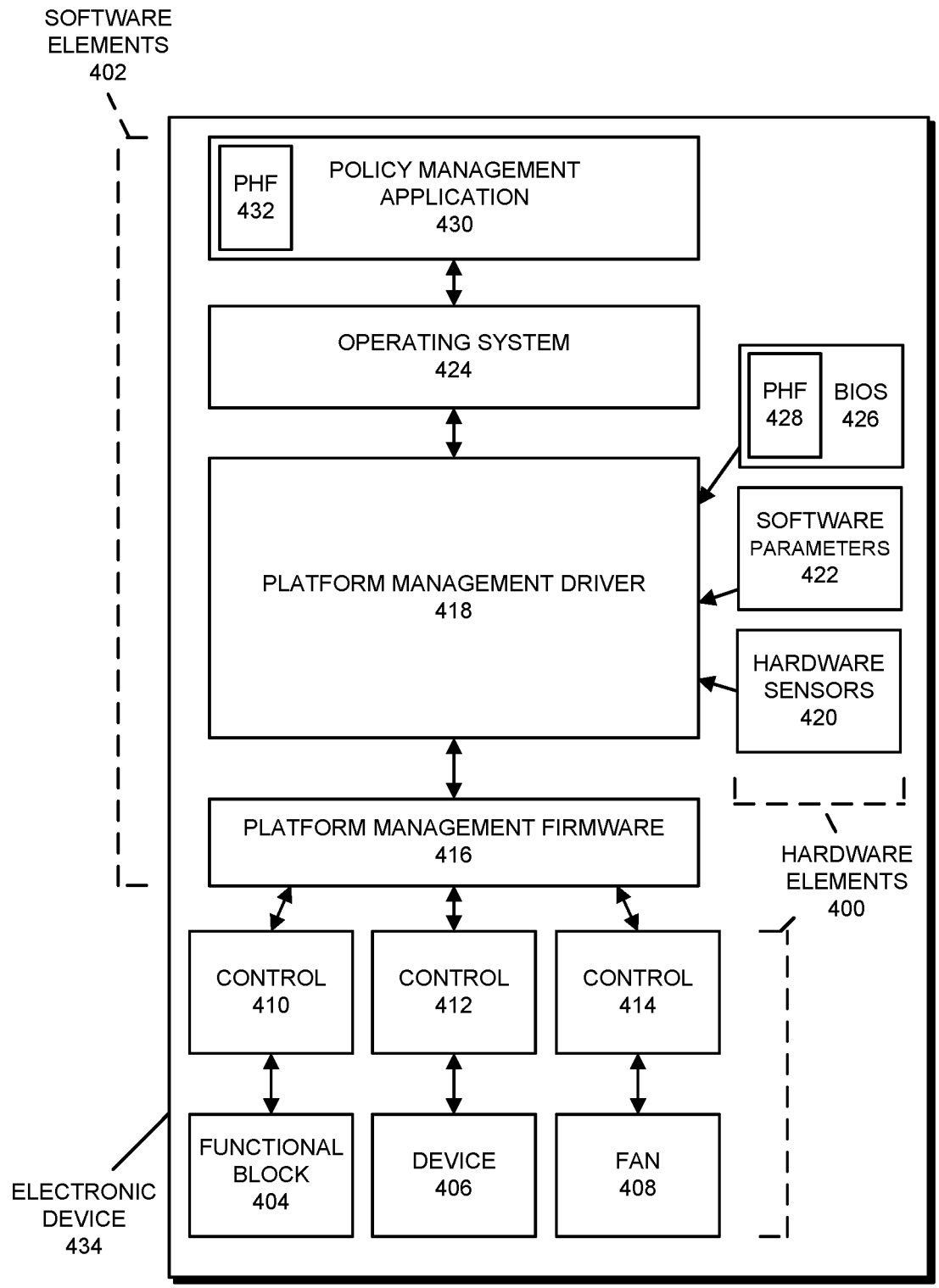
FIG. 4 presents a block diagram illustrating hardware elements and software elements in an electronic device in accordance with some implementations.

In the described implementations, hardware and software elements in an electronic device perform operations for using platform management policies from platform management profiles for controlling operating states of elements (e.g., functional blocks, devices, etc.) of the electronic device. FIG. 4 presents a block diagram illustrating hardware elements 400 and software elements 402 in an electronic device in accordance with some implementations. Generally, "hardware" elements 400 are elements (e.g., functional blocks) that include circuitry and/or devices within the electronic device, while "software" elements 402 are software entities executed by the electronic device. In other words, software elements 402 are or include program code that, when executed by one or more processors (or other elements) in the electronic device, cause the one or more processors to perform the operations described herein.

As can be seen in FIG. 4, the hardware elements 400 include functional block 404, device 406, and fan 408. Functional block 404 is a functional block such as a CPU, GPU, ASIC, network interface card, interconnect controller, memory controller, etc. Device 406 is a device such as a disk drive, display/display controller, expansion card, etc. Fan 408 is a cooling fan that circulates air through a chassis in which functional block 404 and device 406 are included (e.g., a desktop or server computer case, a laptop body, etc.) in order to help regulate the temperature of functional block 404 and device 406. That is, to help prevent functional block 404 and device 406 or the chassis from overheating by circulating air past functional block 404 and device 406.

The hardware elements 400 also include controller (CONTROL) 410, controller 412, and controller 414. Controller 410 is a controller (e.g., a management unit, power controller, etc.) that controls the operating state of functional block 404. Controller 412 is a controller that controls the operating state of device 406. Controller 414 is a fan controller that controls the operating speed of fan 408. In some implementations, controllers 410-414 communicate commands, information, and/or other requests to the respective hardware elements (i.e., functional block 404, device 406, etc.) in order to set and reset the operating states of the respective hardware elements (possibly in addition to performing other operations). For example, controller 410 can set voltages, clock frequencies, queue depths, communication rates, memory access rates, and/or other operating parameters of functional block 404 to align with desired operating states. For instance, controller 410 may cause functional block 404 to operate in a lower power operating state such as a sleep or low performance operating state by reducing power supply voltages and/or clock frequencies provided to functional block 404—or by commanding functional block 404 to enter the lower power operating state (i.e., reduce its own power supply voltages and/or clock frequencies).

Software elements 402 include platform management firmware 416. Platform management firmware 416 is a software entity that performs operations of firmware program code executed by a processor in the electronic device. Platform management firmware 416 receives (via a software interface) data, control signals, etc. destined for controls 410-414 from platform management driver 418 and forwards corresponding communications to controls 410-414. For example, in some implementations, platform management firmware 416 receives, from platform management driver 418, a command destined for a given controller from among controllers 410-414 (e.g., a command to enter a particular power mode) and communicates a corresponding command to the given controller. Platform management firmware 416 also receives (via a software interface) data, control signals, etc. destined for platform management driver 418 from controls 410-414 and forwards corresponding communications to platform management driver 418. For example, in some implementations, platform management firmware 416 receives sensor values from some or all of functional block 404, device 406, and/or fan 408 via the respective controller 410-414 and forwards the sensor values to platform management driver 418.

Software elements 402 include platform management driver 418. Platform management driver 418 is a software entity that performs operations of driver program code executed by a processor in the electronic device. Platform management driver 418 and platform management firmware 416 together are software entities that perform operations for controlling the operating state of functional block 404, devices 406, and/or fans 408—i.e., are part of a platform management framework for implementing platform management policies as described herein. Platform management driver 418 receives data, control signals, sensor information, etc. from other hardware elements and software elements and interacts with controllers 410-414 for controlling the operating states of the functional block 404, device 406, and/or fan 408. For this operation, platform management driver 418 receives inputs from hardware elements and/or software elements (e.g., hardware sensors 420, software parameters 422, functional block 404 (via controller 410 and platform management firmware 416), operating system 424, BIOS 426, etc.) and determines operating states for some or all of functional block 404, device 406, and/or fan 408. Platform management driver 418 then communicates commands, settings, thresholds, and/or other information to controllers 410-414 via platform management firmware 416 that are used by controllers 410-414 for controlling functional block 404, device 406, and/or fan 408. In some implementations, platform management driver 418 also performs other operations associated with platform management. The operations performed by platform management driver 418 are described in more detail below.

Hardware elements 400 include hardware sensors 420. Hardware sensors 420 are functional blocks and devices that sense internal and/or external operating environment values (e.g., sensors 108). For example, in some implementations, hardware sensors 420 include some or all of temperature sensors, proximity sensors (e.g., user detection sensors, etc.), user movement and/or gaze sensors, sound sensors, light sensors, location/movement sensors, lid closure sensors, external device detection sensors, battery level sensors, subsystem power mode sensors, physical location sensors, etc. Hardware sensors 420 provide data and information representing sensed operating environment values to platform management driver 418, where the operating environment values can be used for various operations including evaluating platform management policies as described herein.

Software elements 402 include software parameters 422. Software parameters 422 are values returned from software entities that perform operations of software sensor program code for sensing internal and/or external software operating conditions for software executed by the processor in the electronic device. For example, in some implementations, software sensor program code is implemented as part of application software, firmware, driver, and/or other software executed by the processor. Software sensor program code can monitor and/or determine and report software parameters 422 such as current or future workload profiles, currently executing applications, status of functional blocks or devices, network traffic levels, full-screen or windowed application reports for software applications executing on electronic device 434, foreground or background software applications executing on electronic device 434, frames per second for software applications executing on electronic device 434, etc. Software parameters 422 include data and information representing sensed software operating condition values that are reported from software sensor program code to platform management driver 418, where the software operating condition values can be used for various operations including evaluating platform management policies as described herein.

Software elements 402 include operating system 424. Operating system 424 is a software entity that performs operations of an operating system executed by the processor in the electronic device. Operating system 424 interfaces between electronic application software executing on electronic device 434 and lower level software elements (e.g., platform management driver 418) and hardware elements (e.g., functional block 404, etc.). For example, operating system 424 may be Windows® from Microsoft of Redmond, Wash., macOS® from Apple, Inc. of Cupertino, Calif., etc. In some implementations, operating system 424 includes software sensor program code and therefore provides data and information from software sensor program code to platform management driver 418—i.e., provides software parameters 422 to platform management driver 418. In other words, one or more routines included within operating system 424 provide the data and information of software parameters 422 and the software parameters 422 can be used by platform management driver 418 (and possibly other functional blocks and devices) for various operations as described herein.

Software elements 402 include BIOS 426. BIOS 426 is a software entity that performs operations of a BIOS (and/or a Unified Extensible Firmware Interface (UEFI)) executed by the processor in electronic device 434. Generally, BIOS 426 includes program code stored in a read only memory (ROM) (e.g., read only memory 112) that is executed by the processor at startup for initializing elements (e.g., functional blocks, devices, etc.) in electronic device 434, as well as for launching operating system 424. In some implementations, platform management driver 418 interacts with BIOS 426 for controlling the operating state of functional block 404, device 406, and/or fan 408. In these implementations, a policy header file 428 is compiled into (i.e., added to, appended to, combined with) BIOS files for BIOS 426 (e.g., at manufacture time and/or subsequently). Platform management driver 418 reads policy header file 428 from the BIOS files from BIOS 426 and extracts the platform management profile from policy header file 428. Operations for using BIOS 426 for providing policy header files 428 to platform management driver 418 are described in more detail below.

Software elements 402 include policy management application 430. Policy management application 430 is a software entity that performs operations of an application program executed by the processor in electronic device 434. In some implementations, policy management application 430 is a software application that interacts with platform management driver 418 for controlling the operating state of functional block 404, device 406, and/or fan 408—i.e., is part of a platform management framework for implementing platform management policies as described herein. In some implementations, policy management application 430 is an application (possibly a background application) that is installed on electronic device by a manufacturer, software vendor, end user, and/or other entity. In some implementations, policy management application is an application that is installed on electronic device 434 by a testing entity (e.g., a testing lab for a manufacturer, an end user, and/or other entity). In some implementations, policy management application 430 provides policy header files (PHF) 432 (e.g., policy header file 200) to platform management driver 418 (via operating system 424) as described herein.

Although a number of hardware elements 400 and software elements 402 are presented in FIG. 4, in some implementations, different hardware elements and software elements are present. For example, in some implementations, multiple functional blocks, devices, and/or fans are present in hardware elements 400. As another example, in some implementations, controller 410 is not a single controller, but is or includes multiple controllers (e.g., a separate functional block controller, a fan controller, etc.). Generally, the described implementations include sufficient hardware elements 400 and software elements 402 to perform the operations described herein.

In addition, although FIG. 4 is presented as an example, FIG. 4 is simplified for clarity and brevity. In some implementations, electronic device 434 includes more applications. In addition, in some implementations, there are additional between the elements and/or other interactions between the elements, such as interactions between BIOS 426 and operating system 424 during a startup of electronic device 434, etc. Generally, in the described implementations, an electronic device includes sufficient hardware and software elements to enable the operations herein described.

Figure 5:
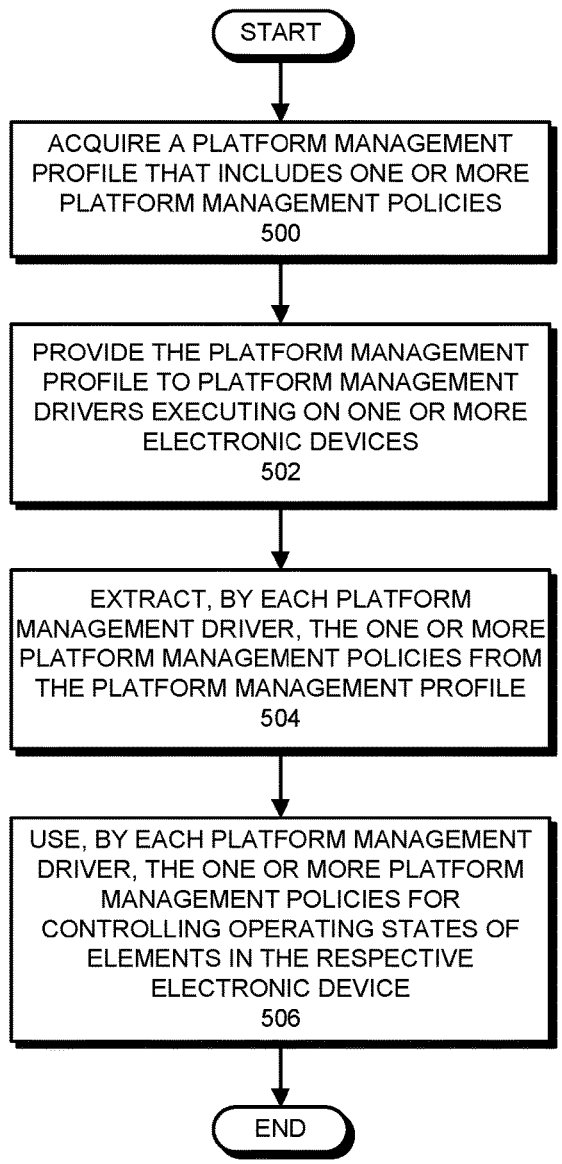
FIG. 5 presents a flowchart illustrating a process for providing policy header files to electronic devices in accordance with some implementations.

In the described implementations, an installing electronic device provides, to one or more target electronic devices (and possibly a large number of target electronic devices), a policy header file including one or more platform management profiles that are used by platform management drivers executing on the target electronic devices for controlling operation of elements (e.g., functional block 404, device 406, fan 408, etc.) for the target electronic devices. FIG. 5 presents a flowchart illustrating a process for providing policy header files to electronic devices in accordance with some implementations. FIG. 5 is presented as a general example of operations performed in some implementations. In other implementations, however, different operations are performed and/or operations are performed in a different order. Additionally, although certain elements are described as performing operations for the process, in some implementations, other elements perform the operations.

For the example in FIG. 5, an "installing" electronic device is described as providing a platform management profile to a "target" electronic device. Although an implementation is described in which the installing electronic device and the target electronic device are separate devices, in some implementations, the installing electronic device and the target electronic device are the same device. For example, a user can generate platform management profiles (e.g., via a user interface, etc.) on an electronic device that is to use the platform management profiles as described herein. In these implementations, the acquiring and providing steps 500-502 are performed on the same electronic device that will be using the platform management profile.

As can be seen in FIG. 5, the process starts when an installing electronic device acquires a platform management profile that includes one or more platform management policies (step 500). For this operation, the installing electronic device acquires the platform management profile (e.g., platform management profile 202) by receiving the platform management profile via a user interface (as described below for FIGS. 9-10), reading the platform management profile from a memory, receiving the platform management profile via a network interface, etc. The installing electronic device then provides the platform management profile to platform management drivers executing on one or more target electronic devices (step 502). For this operation, the installing electronic device makes the platform management profile available to the platform management drivers on each of the electronic device. For example, as described for FIG. 6, the installing electronic device can incorporate the platform management profile into a policy header file that is compiled into BIOS files for each target electronic device. As another example, as described for FIGS. 7-8, the installing electronic device can incorporate the platform management profile into a policy header file that is communicated to the platform management drivers via a policy management application executing on the target electronic devices.

The platform management driver on each target electronic device then extracts one or more platform management policies from the platform management profiles (step 504). For this operation, each platform management driver acquires (from the BIOS files) or receives (from the policy management application) the policy header file and reads the platform management profiles from the policy header file. The platform management driver then reads the individual platform management policies from the platform management profile. Recall that platform management policies are listings, records, and/or other identifiers for determining when a specified output action is to be taken or performed based on one or more inputs meeting an indicated condition. When reading each of the platform management policies, therefore, the platform management drivers read input information that identifies one or more inputs for that platform management policy; condition information that identifies one or more conditions for or associated with the one or more inputs; and output action information identifying one or more output actions to be performed by a given platform management driver for controlling operating states of elements (e.g., functional blocks, devices, etc.) when the one or more conditions are met.

The platform management driver then uses the one or more platform management policies for controlling operating states of elements on the respective target electronic device (step 506). For this operation, each platform management driver receives, from hardware sensors (e.g., hardware sensors 420) and/or software sensor program code, values for the inputs for each platform management policy—i.e., sensor values from the hardware sensors and software parameters from the software sensor program code (e.g., software parameters 422). Each platform management driver then uses one or more conditions associated with each platform management policy to determine whether (or what) output action is to be taken or performed. For example, the inputs for a platform management policy can include a given software application (e.g., a video player application, a productivity application, etc.) being executed and a time of day, and the condition can be that both of these inputs are to be true. In this case, when the platform management driver finds the inputs to be true (i.e., the given software application is executing and it is the time of day), the platform management driver performs a corresponding output action (e.g., computer speakers can be reduced in volume, display brightness can be adjusted, processor performance can be increased, network interface speed can be increased, etc.). As another example, the inputs can include ambient sound in an environment around the target electronic device and the condition can be the sound being lower than a given threshold. In this case, when the platform management driver finds the input to be true (i.e., the ambient sound is below the threshold, such as when a laptop computer is being used in a quiet environment such as a library or classroom), the platform management driver performs a corresponding output action (e.g., decreases element performance levels to avoid the generation of heat, lowers fan speeds, halts unused disk drives, mutes alert sounds, etc.). In this way, the platform management driver on each of the target devices controls operating states of elements on the target device based on the platform management policies found in the platform management profile. Note that controlling operating states of "elements," as described herein, can include controlling operating states of individual elements (e.g., individual functional blocks, devices, fans, etc.) or groups of elements.

Figure 6:
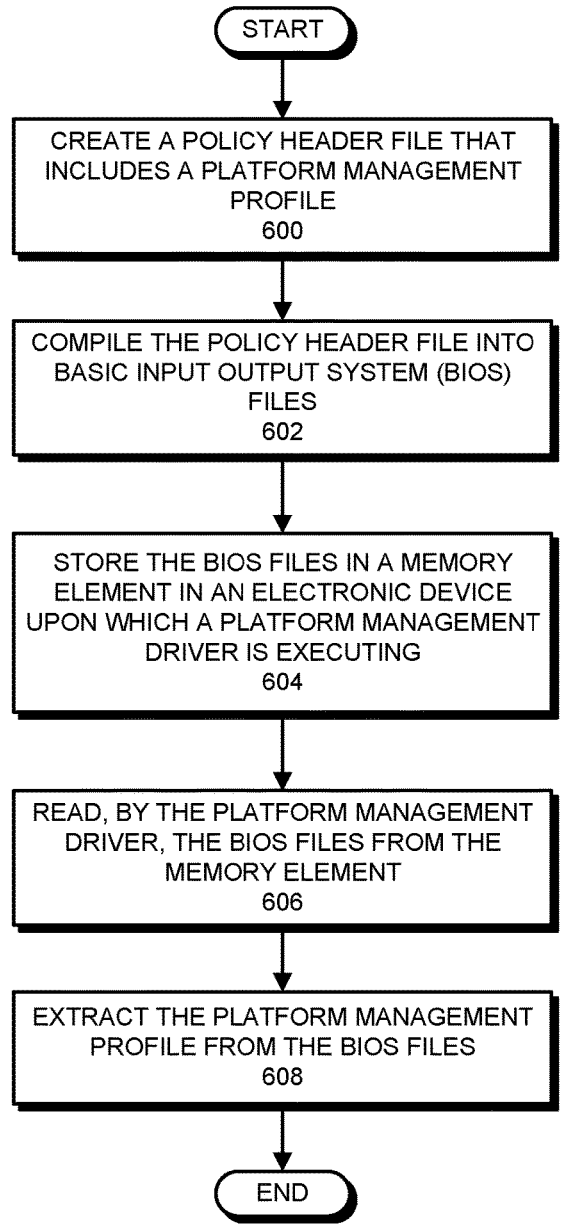
FIG. 6 presents a flowchart illustrating a process for providing a policy header file to an electronic device via BIOS files in accordance with some implementations.

In the described implementations, an installing electronic device provides, to one or more target electronic devices, a policy header file including one or more platform management profiles that are used by platform management drivers executing on the target electronic devices for controlling operation of elements (e.g., functional blocks, devices, etc.) for the target electronic devices. FIG. 6 presents a flowchart illustrating a process for providing a policy header file to an electronic device via BIOS files in accordance with some implementations. FIG. 6 is presented as a general example of operations performed in some implementations. In other implementations, however, different operations are performed and/or operations are performed in a different order. Additionally, although certain elements are used in describing the processes, in some implementations, other elements perform the operations.

For the example in FIG. 6, the installing electronic device stores the policy header file—incorporated in BIOS files—to a memory element in each target electronic device, from where the policy header file is read and used by a platform management driver. In some implementations, this can be "static" configuration of the platform management driver, as the policy header file can be stored in the memory prior to bootup of the target electronic device. For example, a manufacturer can install the policy header file on the target electronic device prior to sale of the electronic device. As another example, an end user can install the policy header file on the target electronic device prior to a boot up operation. In this way, the installing electronic device statically configures the target electronic device with the policy header file—i.e., sets up platform management policies to be used on the target electronic device prior to the target electronic device being sold.

For the example in FIG. 6, an installing electronic device provides a platform management profile to a target electronic device. Although an implementation is described in which the installing electronic device and the target electronic device are separate devices, in some implementations, the installing electronic device and the target electronic device are the same device. For example, a user can generate platform management profiles (e.g., via a user interface, etc.) on an electronic device that is to use the platform management profiles as described herein. In these implementations, the creating, compiling, and storing steps 600-604 are performed on the same electronic device that will be using the platform management profile As can be seen in FIG. 6, the process starts when an installing electronic device creates a policy header file that includes a platform management profile (step 600). For this operation, the installing electronic device acquires the platform management profile (e.g., platform management profile 202) by receiving the platform management profile via a user interface (as described below for FIGS. 9-10), reading the platform management profile from a memory, receiving the platform management profile via a network interface, etc. The installing electronic device then generates the policy header file including the platform management profile. In other words, the installing electronic device assembles the policy header file including code, listings, identifiers, etc. that define the platform management profile (and possibly other information) in the policy header file. For example, in some implementations, the installing electronic device creates the policy header file as a binary file that can be read from the BIOS files by a platform management driver and is compatible with BIOS files.

The installing electronic device then compiles the policy header file into BIOS files (step 602). For this operation, the installing electronic device incorporates the policy header file into the BIOS files in such a way that the policy header file can be read by platform management drivers. For example, the installing electronic device can append the policy header file to the end of the BIOS files, can add the policy header file to a specified section of the BIOS files, etc. The installing electronic device then stores the BIOS files in a memory element in a target electronic device—i.e., in an electronic device upon which a platform management driver is executing (step 604). For this operation, the installing electronic device stores the BIOS files in the memory element (e.g., read only memory 112) on the target electronic device. By storing the BIOS files including the policy header file in the memory element on the target electronic device, the installing electronic device "provides" the policy header file to the platform management driver executing on the target electronic device (again, makes the policy header file available to the platform management driver).

The platform management driver on the target electronic device then reads the BIOS files from the memory element (step 606). For this operation, as the platform management driver starts up, or otherwise is to use the platform management policy in the policy header file, the platform management driver reads the BIOS files. While reading the BIOS files, the platform management driver extracts the platform management platform management policy (and thus the platform management profiles included therein) from the BIOS files (step 608). In this way, the platform management driver prepares itself to use the platform management policies for subsequent operation (e.g., as described for step 506).

Figure 7:
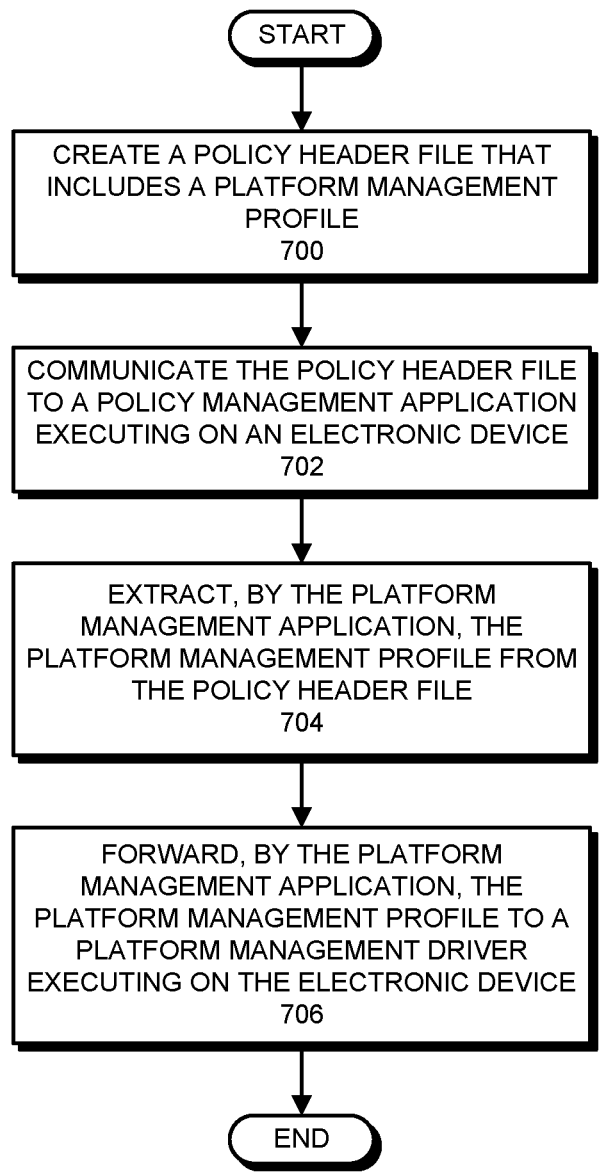
FIG. 7 presents a flowchart illustrating a process for providing a policy header file to an electronic device via a policy management application in accordance with some implementations.
Figure 8:
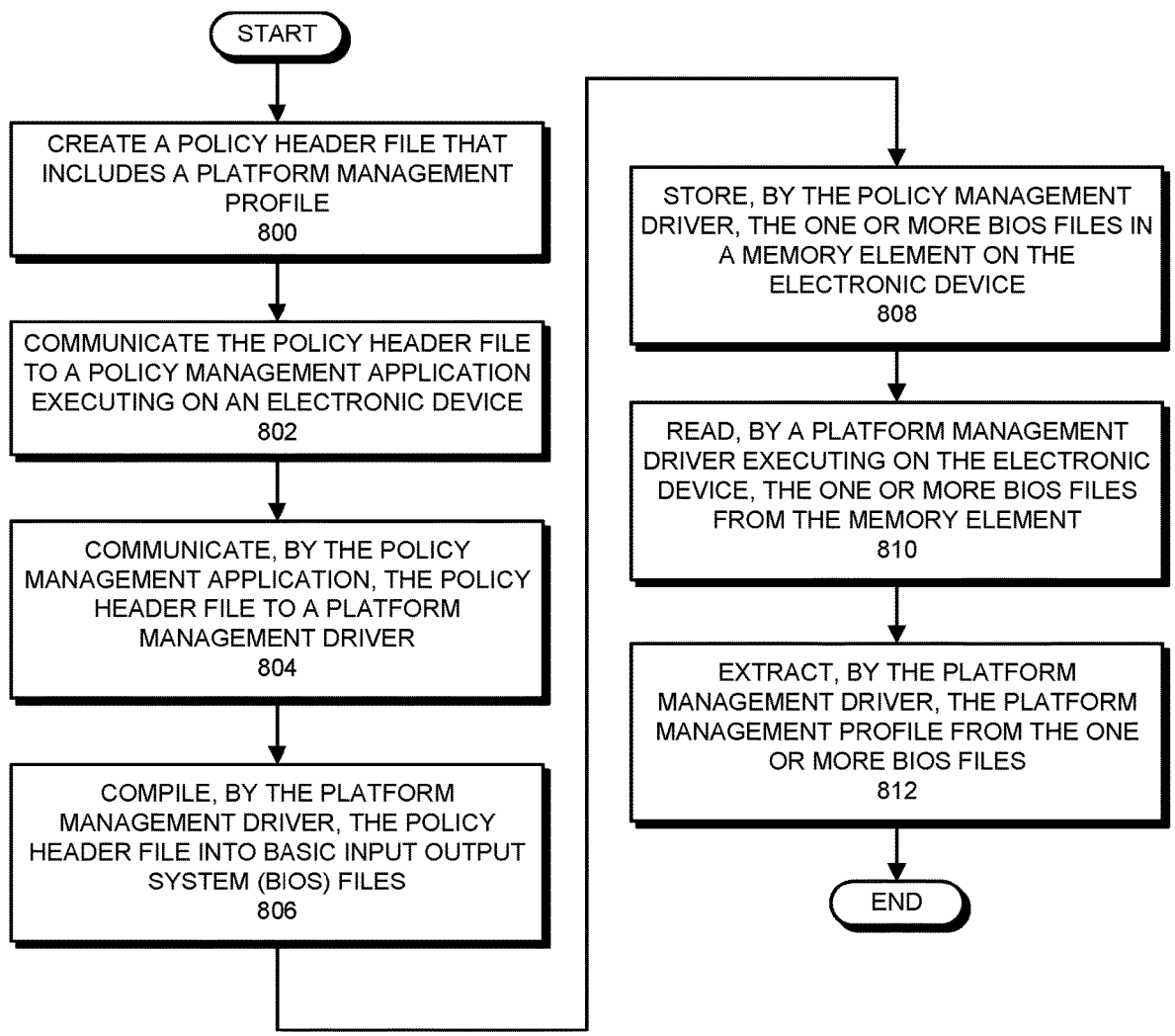
FIG. 8 presents a flowchart illustrating a process for providing a policy header file to an electronic device via a policy management application and BIOS files in accordance with some implementations.

In the described implementations, an installing electronic device provides, to one or more target electronic devices, a policy header file including one or more platform management profiles that are used by platform management drivers executing on the target electronic devices for controlling operation of elements (e.g., functional blocks, devices, etc.) for the target electronic devices. FIG. 7 presents a flowchart illustrating a process for providing a policy header file to an electronic device via a policy management application in accordance with some implementations. FIG. 8 presents a flowchart illustrating a process for providing a policy header file to an electronic device via a policy management application and BIOS files in accordance with some implementations. FIGS. 7-8 are presented as general examples of operations performed in some implementations. In other implementations, however, different operations are performed and/or operations are performed in a different order. Additionally, although certain elements are used in describing the processes, in some implementations, other elements perform the operations.

For the examples in FIG. 7-8, an installing electronic device uses a policy management application as an intermediary for communicating a policy header file to a platform management driver on a target electronic device. In some implementations, this is "dynamic" configuration of the platform management driver, as the policy header file can be provided to the platform management driver via the policy management application at runtime. In other words, the policy header file can be provided to the platform management driver at any time that the target electronic device is executing the policy management application—and is or will execute the platform management driver. For example, a manufacturer, software vendor, user, and/or other entity can provide freshly generated (e.g., updated, newly created, etc.) policy header files to target devices as the target devices are in use (e.g., after being sold, etc.). For instance, the manufacturer or software vendor can determine new use cases (e.g., new applications being used, peripherals being installed, etc.) for target electronic device using telemetry information collected from the target electronic device (or a group of electronic devices) and can then forward an updated policy header file that accounts for the new use cases to target electronic device. In this way, the installing electronic device dynamically configures the target electronic device with the policy header file—i.e., sets up platform management policies to be used on the target electronic device as the target electronic device is in use.

The examples in FIGS. 7-8 differ in how the platform management driver is provided the policy header file (and thus the platform management profile therein). For the example in FIG. 7, the policy management application itself forwards the policy header file to the platform management driver. In some of these implementations, the platform management driver does not "remember" the policy header file (and does not otherwise store the policy header file)— and will therefore need to be forwarded the policy header file from the policy management application each time that the platform management driver commences operation (e.g., at startup, etc.). In contrast, for the example in FIG. 8, after receiving the policy header file from the policy management application, the platform management driver adds the policy header file to BIOS files, from where the platform management driver reads the policy header file (e.g., at startup or at another time). In these implementations, once the platform management driver writes the policy header file to the BIOS files, the policy management application is not involved in subsequent operations for providing that particular policy header file to the platform management driver (although the policy management application may communicate a new/updated policy header file to the platform management driver).

For the examples in FIGS. 7-8, an "installing" electronic device provides a platform management profile to a "target" electronic device. Although an implementation is described in which the installing electronic device and the target electronic device are separate devices, in some implementations, the installing electronic device and the target electronic device are the same device. For example, a user can generate platform management profiles (e.g., via a user interface, etc.) on an electronic device that is to use the platform management profiles as described herein. In these implementations, the creating and communicating in steps 700-702 and 800-802 are performed on the same electronic device that will be using the platform management profile For the process shown in FIG. 7, the process starts when an installing electronic device creates a policy header file that includes a platform management profile (step 700). For this operation, the installing electronic device acquires the platform management profile (e.g., platform management profile 202) by receiving the platform management profile via a user interface (as described below for FIGS. 9-10), reading the platform management profile from a memory, receiving the platform management profile via a network interface, etc. The installing electronic device then generates the policy header file including the platform management profile. In other words, the installing electronic device assembles the policy header file including code, listings, identifiers, etc. that define the platform management profile (and possibly other information) in the policy header file.

The installing electronic device then communicates the policy header file to a policy management application executing on the target electronic device (step 702). For this operation, the installing electronic device communicates the policy header file to the policy management application using an available channel such as a network channel, a physical channel such as a USB device (which may involve a user plugging the USB device into the target electronic device), sharing the policy header file on an Internet website (which may involve a user downloading the policy header file to the target electronic device), etc. In implementations where the installing and target electronic devices are the same electronic device, performing this operation can involve the communication of the policy header file to the policy management application via a communication fabric in the electronic device. Regardless of the particular channel or technique used for communicating the policy header file, the policy header file is delivered, i.e., "provided," from the installing electronic device to the policy management application executing on the target electronic device.

The policy management application then extracts the platform management policy from the policy header file (step 704). For this operation, the policy management application processes the policy header file to read the platform management profile (and thus the included platform management policies). The policy management application then forwards the platform management profile to a platform management driver executing on the target electronic device (step 706). For this operation, the policy management application communicates the platform management profile to the platform management driver using inter-application communication. For example, the policy management application can store the platform management profile to memory and then trigger an interrupt or otherwise inform the platform management driver that the platform management profile is ready in the memory. In this way, the platform management driver is prepared by the policy management application to use platform management policies in the platform management profile for subsequent operation (e.g., as described for step 506).

For the process shown in FIG. 8, the process starts when an installing electronic device creates a policy header file that includes a platform management profile (step 800). For this operation, the installing electronic device acquires the platform management profile (e.g., platform management profile 202) by receiving the platform management profile via a user interface (as described below for FIGS. 9-10), reading the platform management profile from a memory, receiving the platform management profile via a network interface, etc. The installing electronic device then generates the policy header file including the platform management profile. In other words, the installing electronic device assembles the policy header file including code, listings, identifiers, etc. that define the platform management profile (and possibly other information) in the policy header file.

The installing electronic device then communicates the policy header file to a policy management application executing on the target electronic device (step 802). For this operation, the installing electronic device communicates the policy header file to the policy management application using an available channel such as a network channel, a physical channel such as a USB device (which may involve a user plugging the USB device into the target electronic device), sharing the policy header file on an Internet website (which may involve a user downloading the policy header file to the target electronic device), etc. In implementations where the installing electronic device and the target electronic device are the same electronic device, performing this operation can involve the communication of the policy header file to the policy management application via a communication fabric in the electronic device. Regardless of the particular channel or technique used for communicating the policy header file, the policy header file is delivered from the installing electronic device to the policy management application executing on the target electronic device.

The policy management application then communicates the policy header file to a the platform management driver (step 804). For this operation, the policy management application communicates the policy header file to the platform management driver using inter-application communication. For example, the policy management application can store the policy header file to memory and then trigger an interrupt or otherwise inform the platform management driver that the policy header file is ready in the memory The platform management driver then compiles the policy header file into BIOS files (step 806). For this operation, the platform management driver incorporates the policy header file into the BIOS files in such a way that the policy header file can subsequently be read by the platform management driver. For example, the platform management driver can append the policy header file to the end of the BIOS files, can add the policy header file to a specified section of the BIOS files, etc. The platform management driver then stores the BIOS files in a memory element in the target electronic device—i.e., in an electronic device upon which a platform management driver is executing (step 808). For this operation, the platform management driver stores the BIOS files in the memory element (e.g., read only memory 112) on the target electronic device. By using the policy management application as an intermediary for storing the BIOS files including the policy header file in the memory element on the target electronic device, the installing electronic device "provides" the policy header file to the platform management driver.

The platform management driver on the target electronic device then reads the BIOS files from the memory element (step 810). For this operation, as the platform management driver starts up or otherwise is to use the platform management policy in the policy header file, the platform management driver reads the BIOS files. While reading the BIOS files, the platform management driver extracts the platform management platform management policy (and thus the platform management profiles included therein) from the BIOS files (step 812). In this way, the platform management driver prepares itself to use the platform management policies for subsequent operation (e.g., as described for step 506).

Figure 9:
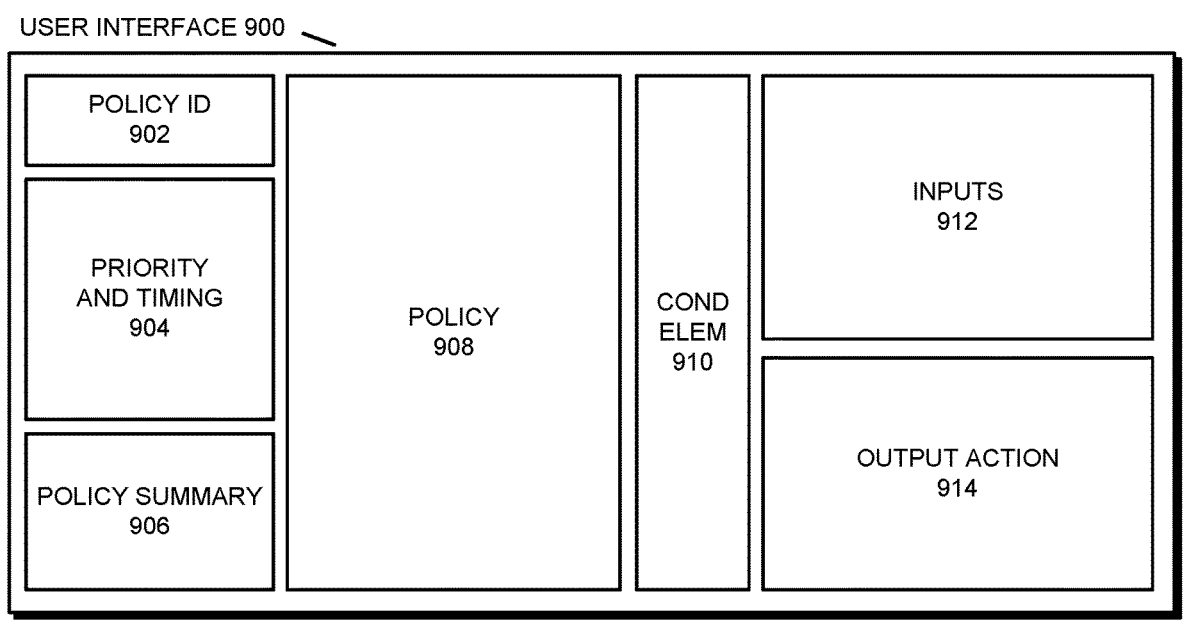
FIG. 9 presents a block diagram illustrating a user interface in accordance with some implementations.
Figure 10:
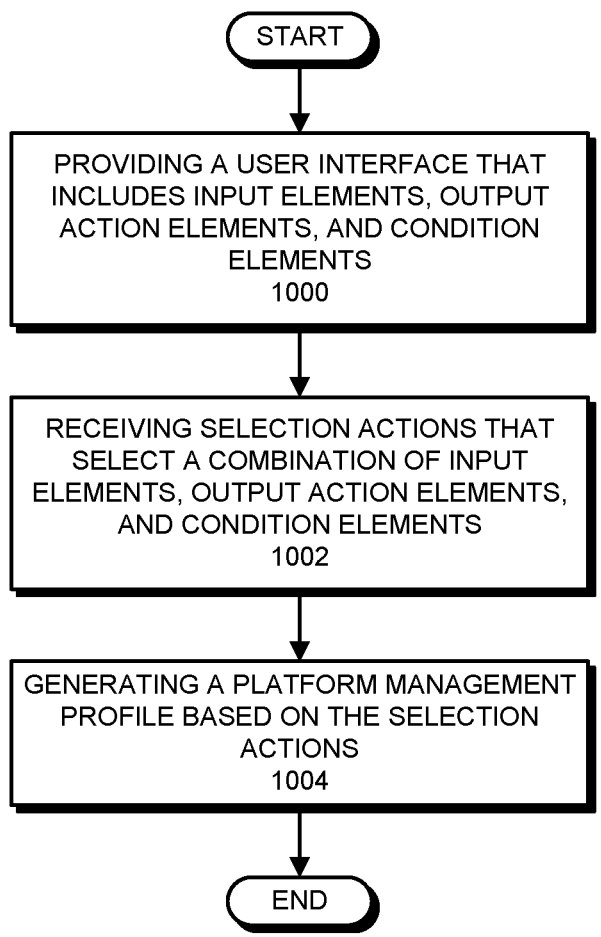
FIG. 10 presents a flowchart illustrating a process for using a user interface in accordance with some implementations.

In some implementations, an electronic device (e.g., a policy management application executed by a processor on an installing electronic device, etc.) provides a graphical user interface that includes a number of elements for creating platform management profiles and the platform management policies included therein. FIG. 9 presents a block diagram illustrating a user interface for generating a platform management profile (and/or platform management policies) in accordance with some implementations. FIG. 10 presents a flowchart illustrating a process for using a user interface for generating a platform management profile (and/or platform management policies) in accordance with some implementations. FIGS. 9-10 are presented as general examples of a user interface and operations performed in some implementations. In other implementations, however, the user interface includes different elements and/or is differently arranged. In addition, in some implementations, different operations are performed and/or operations are performed in a different order. Additionally, although certain elements are used in describing FIGS. 9-10, in some implementations, other elements are used.

As can be seen in FIG. 9, user interface 900 includes policy identifier (ID) 902, priority and timing 904, policy summary 906, policy 908, conditional elements (ELEM) 910, inputs 912, and output actions 914. Generally, each of the elements in user interface includes graphical elements that describe a platform management profile and/or platform management policy being created and enable a user to easily point and click (e.g., using a mouse pointer, a stylus, etc.) for selecting elements for defining a platform management profile and/or platform management policy. Policy identifier 902 is an element that includes information about a platform management profile and/or platform management policy that is being created (e.g., a name, a size, a date, a compatibility, a version, a target electronic device identifier, etc.). Priority and timing 904 is an element that includes information about a timing when the platform management profile and/or platform management policy is to be used by a target device (e.g., a time during the day or night when the platform management profile and/or platform management policy will be in effect) and/or a priority of the platform management profile and/or platform management policy with regard to a preset specification of priorities for platform management profiles and/or platform management policies. In some implementations, priority and timing 904 includes selectable graphical elements (e.g., radio buttons, text entry boxes, sliders, etc.) for defining the timing and/or priority of the platform management profile and/or platform management policy. Policy summary 906 is an element that includes information summarizing the platform management profile and/or platform management policy, e.g., times of day/night the platform management profile and/or platform management policy will be in effect, etc.

Policy 908 is an element that includes a graphical depiction of the platform management profile and/or platform management policy being created. In some implementations, policy 908 starts with basic/general information about the platform management profile and/or platform management policy being created and the various inputs, conditions, and output actions for each platform management profile and/or platform management policy are added to the display in a readily understandable way as the user selects each of these so that the user can see what inputs, conditions, and output actions will be used—and how they will be used—for the platform management profile and/or platform management policy being created. For example, in some implementations, inputs are displayed in a first portion of policy 908 (e.g., in an inputs box or other graphical element within policy 908), conditions are displayed in a second portion of policy 908, and output actions are displayed in a third portion of policy 908. In some implementations, inputs, conditions, and output actions are displayed in a format similar to a mathematical equation. In some implementations, the inputs, conditions, and/or output actions in policy 908 can be selected and can have operations performed on them, e.g., deletion, copying, organizing, defining, etc.

Conditional elements 910 is an element that includes graphical elements representing conditions that can be included in platform management profiles and/or platform management policies being created. For example, in some implementations, the graphical elements include some or all of comparison elements for comparing values (e.g., a > or < sign, etc.), equivalency elements for testing equivalency of values (e.g., an = sign, etc.), and ordering elements for identifying orders in which values are compared or tested (e.g., brackets or parentheses, etc.). In some implementations, the graphical elements can be selected to add the corresponding condition to a platform management profile and/or platform management policy being created.

Input element 912 is an element that includes graphical elements representing the inputs (e.g., hardware sensor and software parameter values) available for use in platform management profiles and/or platform management policies being created. For example, in some implementations, the graphical elements include a listing of each hardware and/or software parameter. In some implementations, the graphical elements can be selected to add the corresponding input to a platform management profile and/or platform management policy being created.

Output action 914 is an element that includes graphical elements representing the output actions available for use in platform management profiles and/or platform management policies being created. For example, in some implementations, the graphical elements include a listing of each setting for operating states of elements (e.g., functional blocks, devices, etc.) that can be adjusted/changed by the platform management driver (directly or indirectly via another functional block or software entity). In some implementations, the graphical elements can be selected to add the corresponding output action to a platform management profile and/or platform management policy being created.

FIG. 10 presents a flowchart illustrating a process for using a user interface for generating a platform management profile in accordance with some implementations. FIG. 10 is presented as a general example of operations performed in some implementations. In other implementations, however, different operations are performed and/or operations are performed in a different order. Additionally, although certain elements are used in describing the processes, in some implementations, other elements perform the operations. As can be seen in FIG. 10, the process starts when an electronic device provides a user interface (e.g., user interface 900) that includes input elements, output action elements, and condition elements (step 1000). The electronic device then receives selection actions (e.g., point and click, text entry, hotkey presses, gestures, etc.) that select a combination of input elements, output action elements, and condition elements (step 1002). For example, a user can hover a mouse over a selectable graphical element (e.g., a radio button with a corresponding label) and click to select the graphical element—i.e., the input elements, output action elements, and condition elements represented by the graphical element. The electronic device then generates a platform management profile based on the selection actions (step 1004). For this operation, the electronic device generates a platform management profile (e.g., platform management profile 202) as described herein.

In some implementations, policy header files are secured in order to prevent tampering with the policy header files. Generally, for this operation, an installing electronic device and/or another entity performs operations for applying protections that avoid the malicious or inadvertent corruption of policy header files in an effort to avoid improper policy header files causing errors or crashes of platform management drivers and/or the electronic devices upon which the platform management drivers are executed. For example, an installing electronic device can encrypt the policy header file, associate the policy header file with a digital fingerprint or checksum, certify the policy header file, and/or otherwise associate protections with the policy header file.

In some implementations, platform management profiles and the platform management policies included therein are checked for compatibility and safety. For example, an installing electronic device and/or a target electronic device (e.g., a platform management driver or policy management application executing on an installing electronic device or target electronic device) may check to ensure that the combinations of inputs, conditions, and output actions are not conflicting, forbidden, and/or likely to cause harm or negatively impact a user's experience if implemented. If a platform management profile and/or platform management policy are found that do not pass such checks, the installing electronic device and/or target electronic device may reject the platform management profile and/or platform management policy.

In some implementations, at least one electronic device (e.g., electronic device 100, etc.) or some portion thereof uses code and/or data stored on a non-transitory computer-readable storage medium to perform some or all of the operations described herein. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., DDR5 DRAM, SRAM, eDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some implementations, one or more hardware modules perform the operations described herein. For example, the hardware modules can include, but are not limited to, one or more central processing units (CPUs)/CPU cores, graphics processing units (GPUs)/GPU cores, application-specific integrated circuit (ASIC) chips, field-programmable gate arrays (FPGAs), compressors or encoders, encryption functional blocks, compute units, embedded controllers, accelerated processing units (APUs), controllers, requesters, completers, network communication links, and/or other functional blocks. When circuitry (e.g., integrated circuit elements, discrete circuit elements, etc.) in such hardware modules is activated, the circuitry performs some or all of the operations. In some implementations, the hardware modules include general purpose circuitry such as execution pipelines, compute or processing units, etc. that, upon executing instructions (e.g., program code, firmware, etc.), performs the operations. In some implementations, the hardware modules include purpose-specific or dedicated circuitry that performs the operations "in hardware" and without executing instructions.

In some implementations, a data structure representative of some or all of the functional blocks and circuit elements described herein (e.g., electronic device 100 or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, T, and X As used herein, despite possibly using similar letters in different locations in this description, the variables and unspecified values in each case are not necessarily the same, i.e., there may be different variable amounts and values intended for some or all of the general variables and unspecified values. In other words, particular instances of N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some implementations.

The foregoing descriptions of implementations have been presented only for purposes of illustration and description. They are not intended to be exhaustive or to limit the implementations to the forms disclosed. Accordingly, many modifications and variations will be apparent to practitioners skilled in the art. Additionally, the above disclosure is not intended to limit the implementations. The scope of the implementations is defined by the appended claims.

What is claimed is:

1. A method, comprising:
   acquiring a platform management profile, the platform management profile including information defining one or more platform management policies; and
   providing the platform management profile to a platform management driver executing on an electronic device, wherein the platform management driver is:
   software situated between an operating system and hardware of the electronic device in a software hierarchy of the electronic device; and
   configured to extract the one or more platform management policies from the platform management profile and use the one or more platform management policies for controlling operating states of elements of the electronic device.

2. The method of claim 1, wherein providing the platform management profile to the platform management driver includes:
   creating a policy header file that includes the platform management profile;
   compiling the policy header file into one or more basic input-output system (BIOS) files; and
   storing the BIOS files in a memory element on the electronic device upon which the platform management driver is executing, the BIOS files being configured so that the platform management driver can read the BIOS files from the memory element and extract the platform management profile from the BIOS files.

3. The method of claim 2, wherein the policy header file is a binary file in a format compatible with the BIOS files.

4. The method of claim 1, wherein providing the platform management profile to the platform management driver includes:

creating a policy header file that includes the platform management profile; and communicating the policy header file to a policy management application executing on the electronic device upon which the platform management driver is executing, the policy header file being configured so that the policy management application can extract the platform management profile from the policy header file and forward the platform management profile to the platform management driver.

5. The method of claim 1, wherein providing the platform management profile to the platform management driver includes:

creating a policy header file that includes the platform management profile; and communicating the policy header file to a policy management application executing on the electronic device upon which the platform management driver is executing, the policy header file being configured so that the policy management application can provide the policy header file to the platform management driver to be compiled into BIOS files, the BIOS files being configured so that the platform management driver can read the BIOS files from a memory element and extract the platform management profile from the BIOS files.

6. The method of claim 1, further comprising:

securing the platform management profile and the one or more platform management policies therein to avoid malicious or erroneous changes to the platform management profile and the one or more platform management policies therein.

7. The method of claim 1, wherein each of the platform management policies includes:

input information that identifies one or more inputs for that platform management policy;

condition information that identifies one or more conditions for or associated with the one or more inputs; and output action information identifying one or more output actions to be performed by the platform management driver for controlling the operating states of the elements of the electronic device when the one or more conditions are met.

8. The method of claim 7, wherein the one or more inputs include data from hardware sensors and/or software parameters from software sensor program code.

9. The method of claim 1, wherein the elements of the electronic device include at least one of functional blocks and devices.

10. The method of claim 1, wherein the platform management driver interacts with one or more controllers for controlling the operating states of the elements of the electronic device.

11. The method of claim 1, wherein the platform management driver:

receives one or more inputs from at least one of a hardware sensor and/or software sensor program code; and controls the operating states of the elements of the electronic device based on the one or more inputs.

12. The method of claim 11, wherein the platform management driver compares values for the one or more inputs to one or more respective thresholds to determine output actions to be taken for controlling the operating states of the elements of the electronic device.

13. An apparatus, comprising:
a memory; and
a processor, the processor configured to:
acquire a platform management profile, the platform management profile including information defining one or more platform management policies; and
provide the platform management profile to a platform management driver executing on an electronic device, wherein the platform management driver is:
software situated between an operating system and hardware of the electronic device in a software hierarchy of the electronic device; and
configured to extract the one or more platform management policies from the platform management profile and use the one or more platform management policies for controlling operating states of elements of the electronic device.

14. The apparatus of claim 13, wherein, when providing the platform management profile to the platform management driver, the processor is further configured to:

create a policy header file that includes the platform management profile;

compile the policy header file into one or more basic input-output system (BIOS) files; and store the BIOS files in a memory element on the electronic device upon which the platform management driver is executing, the BIOS files being configured so that the platform management driver can read the BIOS files from the memory element and extract the platform management profile from the BIOS files.

15. The apparatus of claim 14, wherein the policy header file is a binary file in a format compatible with the BIOS files.

16. The apparatus of claim 13, wherein, when providing the platform management profile to the platform management driver, the processor is further configured to:

create a policy header file that includes the platform management profile; and communicate the policy header file to a policy management application executing on the electronic device upon which the platform management driver is executing, the policy header file being configured so that the policy management application can extract the platform management profile from the policy header file and forward the platform management profile to the platform management driver.

17. The apparatus of claim 13, wherein, when providing the platform management profile to the platform management driver, the processor is further configured to:

create a policy header file that includes the platform management profile; and communicate the policy header file to a policy management application executing on the electronic device upon which the platform management driver is executing, the policy header file being configured so that the policy management application can provide the policy header file to the platform management driver to be compiled into BIOS files, the BIOS files being configured so that the platform management driver can read the BIOS files from the memory element and extract the platform management profile from the BIOS files.

18. The apparatus of claim 13, wherein the processor is further configured to:

secure the platform management profile and the one or more platform management policies therein to avoid malicious or erroneous changes to the platform management profile and the one or more platform management policies therein.

19. The apparatus of claim 13, wherein each of the platform management policies includes:
- input information that identifies one or more inputs for that platform management policy;
- condition information that identifies one or more conditions for or associated with the one or more inputs; and
- output action information identifying one or more output actions to be performed by the platform management driver for controlling the operating states of the elements of the electronic device when the one or more conditions are met.

* * * * *